US012692366B2

(12) United States Patent
Kang et al.

(10) Patent No.: US 12,692,366 B2
(45) Date of Patent: Jul. 28, 2026

(54) ESTER-BASED PLASTICIZER COMPOSITION AND USE THEREOF

(71) Applicant: HANWHA SOLUTIONS CORPORATION, Seoul (KR)

(72) Inventors: Paul Kang, Daejeon (KR); Yangjung Kim, Daejeon (KR); Minjeong Kim, Daejeon (KR); Kidon Kim, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 595 days.

(21) Appl. No.: 18/270,303

(22) PCT Filed: Dec. 29, 2021

(86) PCT No.: PCT/KR2021/020138

§ 371 (c)(1),
(2) Date: Jul. 19, 2023

(87) PCT Pub. No.: WO2022/146021

PCT Pub. Date: Jul. 7, 2022

(65) Prior Publication Data

US 2024/0124681 A1 Apr. 18, 2024

(30) Foreign Application Priority Data

Dec. 30, 2020 (KR) ........................ 10-2020-0187717

(51) Int. Cl.
*C08K 5/12* (2006.01)
*C08K 5/00* (2006.01)

(52) U.S. Cl.
CPC .............. *C08K 5/12* (2013.01); *C08K 5/0016* (2013.01); *C08K 2201/014* (2013.01)

(58) Field of Classification Search
CPC .. C08K 5/12; C08K 5/0016; C08K 2201/014; C07C 69/82; C08L 27/06
See application file for complete search history.

(56) References Cited

U.S. PATENT DOCUMENTS 4,661,622 A 4/1987 Matsumoto

FOREIGN PATENT DOCUMENTS

| | | | | |
|---|---|---|---|---|
| CN | 104926648 | A | | 9/2015 |
| JP | 59-15436 | A | | 1/1984 |
| JP | S 5915436 | A | * | 1/1984 |
| JP | 2-158649 | A | | 6/1990 |
| JP | 11-349537 | A | | 12/1999 |
| KR | 10-2008-0105341 | A | | 12/2008 |
| KR | 10-2255008 | B1 | | 5/2021 |
| WO | 2021137376 | A1 | | 7/2021 |

OTHER PUBLICATIONS

International Search Report for PCT/KR2021/020138 dated Apr. 11, 2022.

Tataroglu et al. "High Molecular Weight Terephthalate Esters (Plasticizers) Via Transesterification Reaction Using MgO as Heterogeneous Catalyst Under Solvent-Free Condition" Process of Petrochemistry and Oil Refining, vol. 2, No. 21, 2005, pp. 82-91.

Extended European Search Report dated Nov. 7, 2024 in application No. 21915819.3.

* cited by examiner

*Primary Examiner* — Robert S Jones, Jr.
*Assistant Examiner* — Joshua Caleb Bledsoe
(74) *Attorney, Agent, or Firm* — Sughrue Mion, PLLC

(57) ABSTRACT

An ester-based plasticizer composition and uses thereof are disclosed. The ester-based plasticizer composition can provide a synergistic effect in the improvement of thermal stability, such as migration resistance and heating loss, to contribute to the enhancement of properties of a molded product. A molded product made from the ester-based plasticizer shows excellent thermal stability as well as mechanical properties due to excellent compatibility and processability with a polyvinyl chloride.

10 Claims, No Drawings

ESTER-BASED PLASTICIZER COMPOSITION AND USE THEREOF

CROSS REFERENCE TO RELATED APPLICATIONS

This application is a National Stage of International Application No. PCT/KR2021/020138 filed Dec. 29, 2021, claiming priority based on Korean Patent Application No. 10-2020-0187717 filed Dec. 30, 2020.

TECHNICAL FIELD

The present invention relates to an ester-based plasticizer composition and a use thereof.

BACKGROUND ART

Polymer resins used in everyday life have been variously applied and used in each of fields of living and home appliances, clothing, automobiles, construction materials, packaging materials, or the like, according to each of their characteristics. In general, polymer resins selected from polyethylene (PE), polypropylene (PP), polystyrene (PS), polyurethane (PU), polyvinyl chloride (PVC), and the like are used universally. In particular, since polyvinyl chloride has hard and soft properties, may be advantageously applied to various molding methods, and has excellent price competitiveness, it has universal utility, and is applied to various fields of application ranging from household goods to industrial materials.

The polyvinyl chloride as such is used with the addition of a plasticizer thereto for implementing various physical properties, rather than being used as a resin alone. The plasticizer serves to impart flexibility to the resin to improve physical properties such as processability and moldability. However, as the industry develops, the role of the plasticizer has been diversified in order to strengthen the properties required depending on the application fields, such as volatility resistance, migration resistance, aging resistance, cold resistance, oil resistance, water resistance, and thermal resistance.

An example of an ester-based compound universally used as the plasticizer may include di-(2-ethylhexyl) phthalate (DEHP), diisononyl phthalate (DINP), di-2-propylheptyl phthalate (DPHP), or diisodecyl phthalate (DIDP), and the like. However, since these are phthalate plasticizers and have an environmental hormone problem, their use tends to be limited. In addition, dioctyl terephthalate (DOTP) which is a representative non-phthalate-based plasticizer has a limitation in improving the physical properties of a product in thermal stability such as migration, and volatility (heating loss).

Thus, a study to provide a plasticizer which may solve a problem of an ester-based compound which is conventionally used as a plasticizer and sufficiently improve the physical properties of a conventional product in terms of various physical properties as well as the processability of a polyvinyl chloride resin is still needed.

DISCLOSURE

Technical Problem

An object of the present invention is to provide an ester-based plasticizer composition having improved thermal stability and a use thereof.

Specifically, an object of the present invention is to provide an ester-based plasticizer composition having improved thermal stability such as migration resistance and heating loss and excellent compatibility, a polyvinyl chloride resin composition including the same, and a molded article manufactured therefrom.

Specifically, an object of the present invention is to provide an ester-based plasticizer composition which not only has improved thermal stability but also may implement excellent tensile strength, elongation, and hardness and impart aging resistance for the physical properties, a polyvinyl chloride resin composition including the same, and a molded article manufactured therefrom.

Technical Solution

In one general aspect, an ester-based plasticizer composition of the following Chemical Formula 1 which satisfies the following Relation 1 is provided:

[Chemical Formula 1]

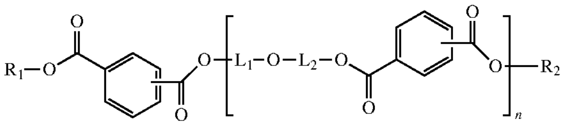

wherein n is an integer of 0 to 10;

$R^1$ and $R^2$ are independently of each other $C_4$-15 alkyl; and $L_1$ and $L_2$ are independently of each other ethylene or propylene, $$0.05 \geq |(A_0 - A_{1-3})/A_n| \geq 0.45 \quad \text{[Relation 1]}$$

wherein $A_n$ is the total weight of the ester-based plasticizer composition of 100 wt %;

$A_0$ is the wt % of a compound of Chemical Formula 1 in which n=0; and $A_{1-3}$ is the wt % of a mixture of Chemical Formula 1 in which n=1-3.

The ester-based plasticizer composition according to an exemplary embodiment may satisfy the following Relation 2:

$$0 \geq A_{4-10}/A_{1-3} \geq 0.2 \quad \text{[Relation 2]}$$

wherein $A_{1-3}$ is the wt % of the mixture of Chemical Formula 1 in which n=1-3, and $A_{4-10}$ is the wt % of the mixture of Chemical Formula 1 in which n=4-10, based on the total weight of the ester-based plasticizer composition.

The ester-based plasticizer composition according to an exemplary embodiment of the present invention may have $A_0$ in a range of 30 to 80 wt %, based on the total weight.

In the ester-based plasticizer composition according to an exemplary embodiment of the present invention, $R_1$ and $R_2$ in Chemical Formula 1 may be independently of each other $C_{7-13}$ branched chain alkyl.

In the ester-based plasticizer composition according to an exemplary embodiment of the present invention, $R_1$ and $R_2$ in Chemical Formula 1 may be independently of each other $C_{4-6}$ straight chain alkyl.

In another general aspect, a polyvinyl chloride resin composition includes the ester-based plasticizer composition described above.

The polyvinyl chloride resin composition according to an exemplary embodiment of the present invention may include 5 to 100 parts by weight of the ester-based plasticizer composition with respect to 100 parts by weight of the polyvinyl chloride resin.

The polyvinyl chloride resin composition according to an exemplary embodiment of the present invention may further include a thermal stabilizer, a filler, or a combination thereof.

In still another general aspect, a molded article manufactured from the polyvinyl chloride resin composition described above is provided.

In addition, the molded article according to an exemplary embodiment of the present invention may be an electric wire covering material, a flooring material, an automobile interior material, a film, a sheet, wallpaper, tube, or the like.

Advantageous Effects

According to the present invention, an ester-based plasticizer composition including two or more ester-based compounds which may sufficiently satisfy the physical properties such as thermal resistance and compatibility required in the thermal resistant resin composition such as a polyvinyl chloride resin may be provided. In particular, since the ester-based plasticizer composition according to the present invention satisfies a certain relation, it is noted in terms of improving the limitation of a conventional plasticizer which is universally used as a plasticizer.

According to the present invention, the composition is particularly excellent in terms of properties related to thermal stability such as migration resistance and heating loss. Due to the synergistic effect as such, according to the present invention, compatibility, that is, plasticization efficiency, may be increased and the physical properties of a molded article may be further improved. Besides, the ester-based plasticizer composition according to the present invention may provide a molded article also having excellent mechanical properties by a combination with the polyvinyl chloride resin.

BEST MODE

Hereinafter, the ester-based plasticizer composition according to the present invention and the use thereof will be described in detail. Here, technical terms and scientific terms used in the present specification have the general meaning understood by those skilled in the art to which the present invention pertains unless otherwise defined, and description for the known function and configuration which may unnecessarily obscure the gist of the present invention will be omitted in the following description.

The singular form used in the present specification may be intended to also include a plural form, unless otherwise indicated in the context.

In addition, units used in the present specification without particular mention are based on weights, and as an example, a unit of % or ratio refers to a wt % or a weight ratio and wt % refers to wt % of any one component in a total composition, unless otherwise defined.

In addition, the numerical range used in the present specification includes all values within the range including the lower limit and the upper limit, increments logically derived in a form and span of a defined range, all double limited values, and all possible combinations of the upper limit and the lower limit in the numerical range defined in different forms. Unless otherwise defined in the specification of the present invention, values which may be outside a numerical range due to experimental error or rounding off of a value are also included in the defined numerical range.

The term "comprise" in the present specification is an open-ended description having a meaning equivalent to the term such as "is/are provided", "contain", "have", or "is/are characterized", and does not exclude elements, materials, or processes which are not further listed.

The term "alkyl" in the present specification refers to a monovalent radical derived from an aliphatic hydrocarbon in a straight chain or branched chain form. In addition, "ethylene" may have a structural formula of $—CH_2CH_2—$, and "propylene" may have a structural formula of $—CH_2CH_2CH_2—$ or $—CH(CH_3)CH_2—$.

Migration of a plasticizer refers to a phenomenon in which a part of the plasticizer mixed with a thermal resistant resin flows out of the thermal resistant resin. In the case of some phthalate-based plasticizers among the conventional plasticizer, when the outflowing plasticizer is introduced to the body, normal activity of an endocrine system which is directly related to life activities may be disrupted or an abnormal reaction may be triggered to inflict fatal harm, and thus, the migration of the plasticizer needs to be suppressed as much as possible. Meanwhile, commonly known conventional non-phthalate-based plasticizers do not cause a problem in an endocrine system when introduced into the body, but their thermal stability is low, so that the migration problem of a plasticizer is not overcome.

Thus, while the present inventors intensified a study on a plasticizer for effectively suppressing the migration of the plasticizer as well as processability with a thermal resistant resin such as a polyvinyl chloride resin, they devised an ester-based plasticizer composition prepared from a combination of alcohols having different structural characteristics from each other. It was confirmed that the ester-based plasticizer composition according to the present invention may have improved thermal stability such as heating loss as well as plasticizer migration which has been pointed out as a limitation of the conventional plasticizer by adjusting the combination of alcohols having structural characteristics different from each other, ratios thereof, and the like, thereby suggesting the present invention.

Hereinafter, the present invention will be described in detail.

The present invention provides an ester-based plasticizer composition of the following Chemical Formula 1 which satisfies the following Relation 1:

[Chemical Formula 1]

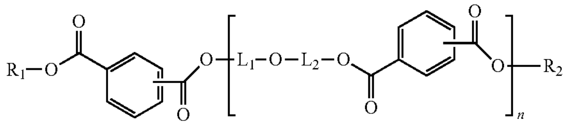

wherein n is an integer of 0 to 10;

$R^1$ and $R^2$ are independently of each other $C_{4-15}$ alkyl; and $L_1$ and $L_2$ are independently of each other ethylene or propylene, $$0.05 \geq |(A_0 - A_{1-3})/A_n| \geq 0.45 \quad \text{[Relation 1]}$$

wherein $A_n$ is the total weight of the ester-based plasticizer composition of 100 wt %;

$A_0$ is the wt % of a compound of Chemical Formula 1 in which n=0; and $A_{1-3}$ is the wt % of a mixture of Chemical Formula 1 in which n=1-3.

The ester-based plasticizer composition according to an exemplary embodiment of the present invention which satisfies Relation 1 is excellent in properties such as heating loss as well as migration resistance, and also, does not cause a disadvantage in the mechanical properties such as hardness, elongation, and tensile strength of a thermal resistant resin employing the composition. In addition, the composition has improved plasticization efficiency even with the inclusion of a polymer-type ester-based compound and also has excellent compatibility with a thermal resistant resin such as a polyvinyl chloride resin. However, when Relation 1 is not satisfied, it is difficult to implement both improved migration and heating loss.

In the ester-based plasticizer composition according to an exemplary embodiment of the present invention, Relation 1 may be more than 0.05, preferably 0.07 or more, more preferably 0.08 or more, and most preferably 0.09 or more and less than 0.45.

Simultaneously, the ester-based plasticizer composition according to an exemplary embodiment of the present invention may satisfy the following Relation 2:

$$0 \geq A_{4-10}/A_{1-3} \geq 0.2 \quad \text{[Relation 2]}$$

wherein $A_{1-3}$ is the wt % of the mixture of Chemical Formula 1 in which n=1-3, and $A_{4-10}$ is the wt % of the mixture of Chemical Formula 1 in which n=4-10, based on the total weight of the ester-based plasticizer composition.

Relations 1 and 2 as such may be appropriately adjusted depending on an amount of $C_{2-3}$ polyalkylene glycol used which is a divalent linking group, that is, a ratio thereof, and when the ester-based plasticizer composition according to an exemplary embodiment of the present invention satisfies Relations 1 and 2 described above, more synergy may be imported to the desired effect, due to an interaction of each ester-based compound in the composition.

Specifically, due to the mix in the composition with the composition described above, the ester-based plasticizer composition according to the present invention may balance the physical properties such as migration and heating loss and improve mechanical properties such as tensile strength and elongation. In addition, significant improvement in aging resistance may be achieved due to their interaction. That is, the ester-based plasticizer composition according to the present invention which satisfies the formula described above may provide a plasticizer composition having further improved migration and heating loss while removing an environmental issue of the conventional phthalate-based plasticizer.

The ester-based plasticizer composition according to an exemplary embodiment of the present invention may have $A_0$ in a range of 30 to 80 wt %, based on the total weight. In addition, in terms of showing further improved synergy for migration, $A_0$ may satisfy a wt % range of more than 30 and less than 80. In addition, it may satisfy a range of 31 to 78 wt % or 31 to 75 wt %.

As an example, the ester-based plasticizer composition may be a mixture of ester-based compounds satisfying n=0 to 8 in Chemical formula 1.

As an example, the ester-based plasticizer composition may be a mixture of ester-based compounds satisfying n=0 to 6 in Chemical formula 1.

As an example, the ester-based plasticizer composition may be a mixture of ester-based compounds satisfying n=0 to 5 in Chemical formula 1. Herein, the ester-based plasticizer composition may include 5 to 40 wt % of an ester-based compound including two or more aromatic cyclic groups.

In the ester-based plasticizer composition according to an exemplary embodiment of the present invention, $R_1$ and $R_2$ in Chemical Formula 1 may be independently of each other $C_{7-13}$ branched chain alkyl, preferably $C_{8-13}$ branched chain alkyl, and more preferably $C_{8-10}$ branched chain alkyl.

As an example, $R_1$ and $R_2$ in Chemical Formula 1 may be independently of each other a substituent derived from monohydric aliphatic alcohol such as 2-ethylhexanol, isononylalcohol, isodecylalcohol, 2-propylheptanol, or isotridecylalcohol.

In the ester-based plasticizer composition according to an exemplary embodiment of the present invention, $R_1$ and $R_2$ in Chemical Formula 1 may be independently of each other $C_{4-6}$ straight chain alkyl, preferably $C_{4-5}$ straight chain alkyl.

As an example, $R_1$ and $R_2$ in Chemical Formula 1 may be a substituent derived from n-butanol and the like.

As an example, the ester-based plasticizer composition includes a polymer-type ester-based plasticizer having a weight average molecular weight of 1000 g/mol or more, at 10 wt % or less based on the total weight. Otherwise, it may be included at 9.5 wt % or less or at 0 wt % or more and less than 9.5 wt %.

As an example, the ester-based plasticizer composition includes a low molecular weight ester-based plasticizer having a weight average molecular weight of less than 1000 g/mol, at 80 wt % or more based on the total weight.

According to an exemplary embodiment of the present invention, it may be an embodiment including a phthalate-based plasticizer which is one of commonly known plasticizers, but in this case, an environmental issue may be removed with significantly lowered migration. A non-phthalate-based plasticizer which is another commonly known plasticizer has a much higher migration value than the phthalate-based plasticizer. For example, a non-phthalate-based plasticizer such as dioctyl terephthalate (DOTP) is an environmentally friendly plasticizer, may implement excellent mechanical properties, and has various application fields, but the use is limited due to the migration problem described above.

However, though the ester-based plasticizer composition according to the present invention includes a significant amount of a conventional non-phthalate-based plasticizer such as DOTP, it is worthy of close attention in that thermal stability such as heating loss as well as migration resistance may be significantly improved and the effect is remarkable as compared with the case of a single compound or in which the relation is not satisfied.

The ester-based plasticizer composition according to an exemplary embodiment of the present invention may be prepared by performing an esterification reaction of an organic acid selected from a phthalic acid and a terephthalic acid and mixed alcohol including $C_{2-3}$ polyalkylene glycol and monohydric aliphatic alcohol in the presence of a catalyst.

As described above, the ester-based plasticizer composition according to the present invention is prepared from a combination of alcohols having structural characteristics different from each other, and the ratio of each composition may be adjusted so that the above relation is satisfied, of course. In addition, conditions of adding each composition and the like may be adjusted.

Specifically, in the method of preparing an ester-based plasticizer composition according to an exemplary embodiment of the present invention, the monohydric aliphatic alcohol may be included at 2 to 10 mol, 2 to 5 mol, or 2 to 3 mol, based on 1 mol of the organic acid. Besides, the $C_{2-3}$ polyalkylene glycol may be included at 0.1 to 5 mol % or 0.3 to 2 mol %, based on 1 mol % of the organic acid. Meanwhile, when 1 to 2 mol % of the $C_{2-3}$ polyalkylene glycol is included based on 1 mol % of the organic acid, the present invention is less affected by the conditions of addition. In particular, in this case, difference in migration and heating loss depending on the conditions of addition is hardly seen.

In addition, migration may be further improved depending on the conditions of adding the mixed alcohol having the same composition. Specifically, the conditions of adding the mixed alcohol may be as follows:

(Addition condition 1) Initial addition in which mixed alcohol including $C_{2-3}$ polyalkylene glycol and monohydric aliphatic alcohol is added simultaneously to an organic acid.

(Addition condition 2) Addition during the reaction in which a monohydric aliphatic alcohol is first added to an organic acid and $C_{2-3}$ polyalkylene glycol is then added during the reaction.

When addition condition 1 is used among the addition conditions described above, a more improved synergistic effect may be imparted to migration resistance. For example, though the content of the compound of Chemical Formula 1 wherein n=0 is in a similar level, a more improved effect on migration resistance is shown, which may be more preferred.

According to the method of preparing an ester-based plasticizer composition according to the present invention described above, the weight average molecular weight of the plasticizer composition may be improved, and an ester-based compound having the increased number of functional groups capable of interacting with the thermal resistant resin, that is, ester groups, and the composition thereof are increased. In general, the aging resistant physical properties and the like of a plasticizer depend on a molecular weight, structural characteristics, and the like, and as the molecular weight of the plasticizer is higher, the aging resistant physical properties are better, but compatibility with the thermal resistant resin tends to be reduced. However, according to the present invention, it is distinguished from conventional technologies in that not only aging resistance physical properties but also compatibility with the thermal resistant resin may be improved at the same time by the interaction thereof in the composition.

In the method of preparing an ester-based plasticizer composition according to an exemplary embodiment of the present invention, the catalyst may be an organometallic catalyst including Sn-based or Ti-based catalyst, an acid catalyst including a sulfonic acid-based or sulfuric acid-based catalyst, or a mixed catalyst thereof. Herein, the amount of the catalyst used is not limited, and may be used in a usual amount of catalyst used. In addition, when an organometallic catalyst including a Zn-based catalyst is used, the relation to be desired in the present invention is not satisfied with low reaction efficiency, which is not preferred.

As an example, in the organometallic catalyst, the Ti-based organometallic catalyst may be selected from tetraalkyl titanate such as tetramethyl titanate, tetraethyl titanate, tetrapropyl titanate, tetraisopropyl titanate, tetrabutyl titanate, tetrapentyl titanate, tetrahexyl titanate, tetraoctyl titanate, tetranonyl titanate, tetradodecyl titanate, tetrahexadecyl titanate, tetraoctadecyl titanate, tetradecyl titanate, and tetraheptyl titanate; and tetraaryl titanate such as tetraphenyl titanate.

As an example, the acid catalyst may be selected from sulfuric acid paratoluene sulfonic acid, methanesulfonic acid, ethanesulfonic acid, propanesulfonic acid, butanesulfonic acid, and the like.

As an example, the catalyst may be used in a usual amount, of course, and specifically, may be used at 0.01 to 1 part by weight, 0.01 to 0.5 parts by weight, or 0.05 to 0.1 parts by weight with respect to 100 parts by weight of the organic acid, but is not limited thereto.

In the method of preparing an ester-based plasticizer composition according to an exemplary embodiment of the present invention, the step may be performed by initiating the esterification reaction at a reaction temperature of 80° C. or higher.

As an example, the reaction temperature of the step may be 135° C. or higher.

As an example, the reaction temperature of the step may be 150° C. or higher.

As an example, the reaction temperature of the step may be 170° C. to 270° C.

In addition, the step may be performed at the reaction temperature described above for 10 minutes to 24 hours. The reaction time may be appropriately adjusted by an acid value obtained by the following Equation 1. A lower acid value is preferred, but the acid value is not limited as long as it is a value of 5 or less. Herein, a high acid value means that an unreacted aromatic compound remains in the plasticizer, and may adversely affect the purity of the plasticizer.

$$\text{Acid value}=(\text{titration amount}\times 5.6\times \text{factor})/\text{sample amount} \quad \text{[Equation 1]}$$

wherein when an alkaline solution used in titration is a 0.1 N KOH aqueous solution, the factor is 1.

In addition, the step may be performed under an inert atmosphere. The inert atmosphere refers to an inert gas atmosphere selected from nitrogen, argon, and the like.

The method of preparing an ester-based plasticizer composition according to an exemplary embodiment of the present invention may further include a purification step including a neutralization step after the step and a recovery step of an unreacted alcohol. The unreacted alcohol recovered by the purification as such may be reused, and thus, is advantageous in that it is continuously used in the reaction step to provide a more economical process.

The neutralization step may be performed using a common alkaline solution.

The step of recovering the unreacted alcohol may be a step of removing a reaction by-product as well as an alcohol present in an unreacted state, and may be a distillation step using a boiling point difference. When the distillation step is used, it is preferred that a difference in boiling points of the materials to be separated is 10° C. or more. In addition, the distillation may be multistage distillation or mixed distillation. The multistage distillation may be separate distillation depending on the boiling point difference of each material to be separated, and the mixed distillation may be simultaneous distillation of the materials to be separated.

In addition, the ester-based plasticizer composition prepared by the preparation method according to an exemplary embodiment of the present invention is the ester-based plasticizer composition of Chemical Formula 1 which satisfies Relation 1, and is an embodiment in which two or more ester-based compounds represented by Chemical Formula 1 are mixed. By the composition as such, the ester-based plasticizer composition according to the present invention exerts an excellent synergistic effect on migration resistance and volatility resistance.

The ester-based plasticizer composition prepared according to the preparation method according to an exemplary embodiment of the present invention may include 30 to 75 wt %, preferably more than 30 wt %, more preferably 31 wt % to 65 wt % of the compound of Chemical Formula 1 wherein n=0. In particular, when the compound of Chemical Formula 1 wherein n=0 is included in a range of 31 to 60 wt %, significantly decreased migration may be shown.

Meanwhile, in the ester-based plasticizer composition prepared by the preparation method according to the present invention, when more than 55 wt % of the compound of Chemical Formula 1 wherein n=0 is included, it may be more advantageous for elongation before heating.

The ester-based plasticizer composition according to an exemplary embodiment of the present invention includes a conventional plasticizer, that is, a plasticizer such as dioctyl terephthalate (DOTP), but may overcome inferior quality of migration, volatility (heating loss), and the like which may be caused therefrom. In addition, an advantage of being excellent in the volatility of a specimen prepared therefrom is provided. As a result, the ester-based plasticizer composition according to the present invention may provide excellent physical properties as a plasticizer.

That is, the ester-based plasticizer composition according to an exemplary embodiment of the present invention may solve not only the problem of the low-molecular weight plasticizer described above, but also the problem of conventional polymer-type plasticizers. Specifically, the ether-based plasticizer composition according to the present invention includes a polymer-type ether-based compound having a weight average molecular weight of 1000 or more, but may implement hardness at an equivalent level to the low-molecular weight plasticizer described above, with improved plasticization efficiency. Thus, it does not provide disadvantage on processability with a thermal resistant resin such as a polyvinyl chloride resin and may contribute to improvement of the physical properties of the molded article manufactured therefrom with high plasticization efficiency.

In addition, the present invention provides a polyvinyl chloride resin composition including the ester-based plasticizer composition described above, and a molded article manufactured therefrom.

As described above, according to the present invention, a molded article which has excellent tensile strength, elongation, and aging resistance (e.g., tensile strength change rate after heating, elongation change rate, and the like) while having improved migration resistance and heating loss may be provided.

The polyvinyl chloride resin may be a copolymer of a vinyl chloride-based monomer alone or a copolymer of a vinyl chloride-based monomer and a comonomer which is copolymerizable therewith. It may be a copolymer prepared by a polymerization method such as suspension polymerization, microsuspension polymerization, emulsion polymerization, or miniemulsion polymerization by mixing a suspending agent, a buffering agent, and a polymerization initiator other than that.

Another monomer which is copolymerizable with the vinyl chloride monomer described above may be used without limitation as long as it is a usual monomer, and as a non-limiting example thereof may include vinyl ester-based monomers including an ethylene vinyl acetate monomer and a vinyl propionate monomer; olefin-based monomers including ethylene, propylene, isobutyl ether, and halogenated olefin; methacrylic acid ester-based monomers including methacrylic acid alkyl ester; anhydrous maleic acid monomers; acrylonitrile monomers; styrene monomers; halogenated polyvinylidene; and the like, and a copolymer with a vinyl chloride monomer may be prepared by mixing one or more thereof. However, the present invention is not limited to the monomer described above, and a monomer which is generally used for forming a copolymer by a polymerization reaction with a vinyl chloride monomer in the art to which the present invention pertains may be used without particular limitation, depending on the physical properties, the use, or the like of the vinyl chloride-based resin composition required for the preparation.

In the polyvinyl chloride resin composition according to an exemplary embodiment of the present invention, the polyvinyl chloride resin having a polymerization degree of 300 to 3,000, preferably 500 to 2,000, and more preferably 700 to 1,200 may be used.

In the polyvinyl chloride resin composition according to an exemplary embodiment of the present invention, the ester-based plasticizer composition may be included at 5 to 100 parts by weight, specifically 10 to 80 parts by weight, and more specifically 30 to 60 parts by weight, based on 100 parts by weight of the polyvinyl chloride resin.

In addition, the polyvinyl chloride resin composition according to an exemplary embodiment of the present invention may further include an additive selected from a thermal stabilizer, a filler, and the like.

As an example, the thermal stabilizer may be a composite thermal stabilizer including two or more selected from Ca, Zn, Al, Mg, and the like.

As an example, the thermal stabilizer may be included at 1 to 15 parts by weight with respect to 100 parts by weight of the polyvinyl chloride resin. Specifically, the thermal stabilizer may be included at 3 to 12 parts by weight, more specifically 5 to 10 parts by weight. When it is used at the content described above, it helps improvement of thermal stability. In addition, since it has excellent compatibility and a synergistic effect with the ester-based plasticizer composition and the polyvinyl chloride resin according to the present invention, it shows better effect than other stabilizers. In addition, it may further include a non-metal stabilizer selected from benzophenol, triazole, acrylonitrile, and the like.

As an example, the filler may improve productivity and dry touch sensation of the polyvinyl chloride resin composition. The filler as such may be selected from calcium carbonate, clay, talc, diatomaceous earth, and the like.

As an example, the filler may be included at 1 to 100 parts by weight, specifically 5 to 50 parts by weight, and more specifically 5 to 30 parts by weight with respect to 100 parts by weight of the polyvinyl chloride resin. In addition, according to the purpose, the filler may be used in an amount of more than 100 parts by weight with respect to 100 parts by weight of the polyvinyl chloride resin, of course.

The polyvinyl chloride resin composition according to an exemplary embodiment of the present invention has an absorption rate and a short melting time for the polyvinyl chloride resin, and thus, increases processability with the polyvinyl chloride resin. In addition, the polyvinyl chloride resin composition according to the present invention may include the polyvinyl chloride resin, and a thermal resistant resin selected from an acryl resin, an ABS resin, a urethane resin, a polyester resin, and the like, and also, may include various polymer resins.

The polyvinyl chloride resin composition according to an exemplary embodiment of the present invention may be applied to prescriptions of various embodiments for its purpose, and as a non-limiting example thereof, a compound prescription, a sheet prescription, a plastisol prescription, and the like may be included.

The molded article manufactured from the polyvinyl chloride resin composition described above may be applied in various embodiments depending on use, shape, and the like, of course. Specifically, the molded article may be an electric wire covering material and the like. In addition, it may be applied to a flooring material, an automobile interior material, a film, a sheet, wallpaper, tube, or the like.

As described above, according to the present invention, a molded article having particularly low heating loss and migration resistance is provided. Herein, the measurement of the migration resistance and heating loss follows the following evaluation method.

As an example, the molded article according to the present invention may have a migration resistance of 0.6% or less.

As an example, the molded article according to the present invention may have a migration resistance of 0.5% or less.

As an example, the molded article according to the present invention may have a migration resistance of 0.01 to 0.5%.

As an example, the molded article according to the present invention may have a migration resistance of 0.05 to 0.5%.

As an example, the molded article according to the present invention may have a heating loss ($W_1$) of 0.65% or less.

As an example, the molded article according to the present invention may have a heating loss ($W_1$) of 0.6% or less.

As an example, the molded article according to the present invention may have a heating loss ($W_1$) of 0.1 to 0.6%.

In addition, the molded article according to an exemplary embodiment of the present invention satisfies not only the thermal stability described above but also excellent tensile strength and elongation. Herein, the measurement of the tensile strength and elongation follows the following evaluation method.

The molded article according to an exemplary embodiment of the present invention may have a tensile strength in accordance with ASTM D638 of 100 to 300 kg/cm2 and an elongation of 300 to 600%. Specifically, the molded article may have a tensile strength of 120 to 250 kg/cm2 and an elongation of 350 to 580%, more specifically a tensile strength of 150 to 200 kg/cm2 and an elongation of 400 to 550%. Herein, the tensile strength and the elongation may be measured at room temperature.

In addition, the molded article according to an exemplary embodiment of the present invention has excellent aging resistance. Specifically, the molded article according to the present invention implements an improved effect even in a thermal resistant aging test. In this regard, the molded article has a less change rate of tensile strength and elongation before and after heating which is performed in accordance with the test method of ASTM D638. In addition, the molded article shows excellent hardness. Besides, in the heating loss and the migration resistance to be desired in the present invention, there is almost no change in the thermal resistant aging test.

Thus, the molded article according to an exemplary embodiment of the present invention may be used as a flooring material, wallpaper, tarpaulin, artificial leather, toy, an automobile lower coating material, or the like, and in particular, has an effect of having good physical properties such as migration and volatility of a plasticizer as compared with an environmentally friendly plasticizer composition using DOTP which is currently most generally used.

Hereinafter, the present disclosure will be described in more detail by the following examples. However, the following examples are only a reference for describing the present invention in detail, and the present invention is not limited thereto and may be implemented in various forms. In addition, unless otherwise defined, all technical terms and scientific terms have the same meanings as those commonly understood by a person skilled in the art to which the present invention pertains. In addition, the terms used herein are only for effectively describing certain examples, and are not intended to limit the present invention.

In addition, unless otherwise stated in the present invention, the unit of temperature is all ° C., and room temperature refers to 25° C.

(Evaluation Method)

1) Migration Resistance:

Each specimen was cut into a circle having a diameter of 3 cm, and an initial weight ($W_1$) and a weight of oil paper before oil absorption ($W_{q1}$) were measured to 4 decimal places. The specimen was inserted between two sheets of 3M oil paper (55 mm×85 mm) of which the initial weight had been measured and allowed to stand in an oven at 70° C. for 4 days in a state of applying a load of 5 kg, the specimen was taken out and the weight of the specimen and the weight of oil paper after oil absorption (W q 2) were measured, and migration was calculated to confirm the migration resistance. The migration was calculated by $(W_{q2}-W_{q1})/W_1\times100$. At this time, the migration refers to a plasticizer outflow amount (%).

2) Heating Loss:

For each specimen, the initial weight ($W_1$) was measured to 4 decimal places. The specimen was fixed in an oven at 120° C. using a clamp, taken out after 72 hours, and stored in a thermostat (room temperature, 25° C.) for 4 hours or more, the weight of the specimen ($W_o$) was measured, and a heating loss ratio (%, $W_1$) was confirmed. The heating loss ratio was calculated by $(W_i-W_o)/W_i\times100$.

3) Hardness (ASTM D2240):

For each specimen, the needle of a hardness tester ("A" type) was completely lowered using a hardness scale (ASKER CL-150, unit: Shore A) in accordance with the method of ASTM D2240, and then a hardness value shown at room temperature after 10 seconds was read. The hardness was tested at 5 points for each specimen, and the average value was calculated.

4) Tensile Strength, Elongation (ASTM D638):

Each specimen was pulled at a cross head speed of 200 mm or/min using U.T.M. which was a test instrument, and then a tensile strength and an elongation at the point where the specimen was cut were measured. The tensile strength ($kgf/cm^2$) was calculated by load value (kgf)/thickness (cm)×width (cm), and the elongation (%) was calculated by extension/initial strength×100. The measurement was performed before heating (room temperature) and after heating (120° C., 100 hr), respectively.

The tensile strength change rate was calculated by (tensile strength after heating−tensile strength before heating)/tensile strength before heating×100. In addition, the elongation change rate was calculated by (elongation after heating−elongation before heating)/elongation before heating×100.

Example 1

To a 1 L reactor equipped with a temperature sensor, a mechanical agitator, a condenser, a decanter, and a nitrogen injector, 320 g of 2-ethylhexanol and 200 g of terephthalic acid were added, and the temperature was raised to 180° C. with stirring under a nitrogen condition. After the heating, 0.2 g of tetra N-butyl titanate (TNBT) was added to proceed with an esterification reaction under the same conditions (reaction time: 8 hours). In the middle of the reaction, 38 g of diethylene glycol (DEG) was added. The point at which diethylene glycol was added was determined by the amount of water produced during the reaction (point of addition: 10.8 g as the amount of water).

When the reaction was completed, the temperature was cooled to 90° C., an alkaline solution (1M NaOH solution) was added, and filtration was performed using diatomaceous earth. Thereafter, unreacted alcohol, water, and impurities were removed using a rotary evaporation concentrator, and a plasticizer composition as the final product was obtained.

The obtained plasticizer composition was subjected to GPC analysis to confirm the content (wt %) of the ester-based compound such as the content (wt %) of DOTP in the composition based on the total weight. The results are shown in the following Table 1.

In addition, the ester-based plasticizer composition prepared by the above preparation method was used to manufacture a specimen. The specimen was manufactured by blending 400 g of PVC (polymerization degree: 1000) with 200 g of a plasticizer composition, 32 g of a composite heat stabilizer (RUP-110), and 80 g of calcium carbonate and working with a roll mill at 170° C. for 3 minutes to manufacture a 1 mm sheet. Thereafter, press working was performed by preheating at 180° C. for 3 minutes, heating for 10 minutes, and cooling for 3 minutes to manufacture a specimen having a thickness of 3 mm.

The results of measuring the physical properties by the evaluation method using the specimen are shown in the following Tables 1 and 2.

Examples 2 to 9

An ester plasticizer composition which was the final product was obtained in the manner similar to the preparation method of Example 1, except that the composition and the weight ratio of the mixed alcohol and the amount added and the addition conditions of polyalkylene glycol were changed as in the following Table 1.

The obtained ester plasticizer composition was subjected to GPC analysis to confirm the content (wt %) of the ester-based compound such as the content (wt %) of DOTP in the composition based on the total weight. The results are shown in the following Table 1. In addition, the specimen was manufactured in the same manner as in Example 1, and the results of measuring the physical properties by the evaluation method are shown in the following Tables 1 and 2.

Comparative Example 1

Commercially available dioctyl terephthalate (DOTP, Hanwha Chemical Corporation) was used.

The specimen was manufactured in the same manner as in Example 1, and the results of measuring the physical properties by the evaluation method are shown in the following Tables 1 and 2.

TABLE 1

| Classification | | Example | | | | | | | | | Comparative Example |
|---|---|---|---|---|---|---|---|---|---|---|---|
| | | 1 | 2 | 3 | 4 | 5 | 6 | 7 | 8 | 9 | 1 |
| DEG | Addition amount (g) | 38 | 51 | 64 | 137 | 197 | 265 | 94 | 94 | 163 | — |
| | Addition ratio | 0.3 | 0.4 | 0.5 | 1.05 | 1.5 | 2 | 0.7 | 0.7 | 1.2 | — |
| | Added moles [1)] | 0.36 | 0.48 | 0.60 | 1.26 | 1.81 | 2.41 | 0.84 | 0.84 | 1.44 | — |
| | Addition condition [2)] | 2 | 2 | 2 | 2 | 2 | 2 | 1 | 2 | 1 | — |
| $A_0$ (DOTP content, wt %) | | 72.14 | 67.3 | 65.22 | 54.9 | 42.8 | 31.01 | 60.12 | 62.7 | 33.5 | 100 |
| $A_{1-3}$ (wt %) | | 27.86 | 32.23 | 34.13 | 43.6 | 53 | 59.66 | 39.07 | 36.9 | 57.5 | — |
| Hardness (Shore A) | | 85.7 | 85.4 | 86.4 | 86.8 | 87.6 | 88.2 | 89.3 | 82.8 | 88.0 | 85.1 |
| Migration (%) | | 0.49 | 0.47 | 0.34 | 0.06 | 0.06 | 0.05 | 0.08 | 0.36 | 0.08 | 0.62 |
| Heating loss ($W_1$, specimen, %) | | 0.58 | 0.48 | 0.40 | 0.38 | 0.32 | 0.29 | 0.57 | 0.50 | 0.29 | 0.67 |

Added moles [1)]: [TPA mole]* [DEG addition ratio] = [Added DEG moles]

Addition condition [2)]: 1 (initial addition), 2 (addition during reaction)

TABLE 2

| Classification | | Examples 1 | 2 | 3 | 4 | 5 | 6 | 7 | 8 | 9 |
|---|---|---|---|---|---|---|---|---|---|---|
| Tensile strength ($kg/cm^2$) | Before heating | 172 | 161 | 172 | 176 | 167 | 171 | 184 | 164 | 184 |
| | After heating | 168 | 158 | 171 | 168 | 167 | 169 | 167 | 159 | 176 |
| Tensile strength change rate (%) | | −2.3 | −1.9 | −0.6 | −4.7 | −0.1 | −1.3 | −9.1 | −3.2 | −4.4 |
| Elongation (%) | Before heating | 526 | 533 | 501 | 479 | 433 | 486 | 569 | 500 | 491 |
| | After heating | 530 | 566 | 525 | 485 | 494 | 495 | 543 | 535 | 495 |
| Elongation change rate (%) | | 0.8 | 6.2 | 4.8 | 1.3 | 14.1 | 1.8 | −4.5 | 7.2 | 0.7 |

As shown in Table 1, when the ester-based plasticizer composition according to the present invention was employed, an excellent effect on improvement of migration resistance and heating loss was exerted. Specifically, it was confirmed in all of the examples according to the present invention that a migration of 0.6% or less and a heating loss of 0.65% or less were satisfied. In particular, the DOTP content satisfied 31 to 55 wt % based on the total weight of the composition, it was confirmed that a more significant synergistic effect was exerted on migration resistance. In addition, it was confirmed in all of the examples according to the present invention that hardness equivalent to or higher than that of the dioctyl terephthalate (DOTP, Comparative Example 1) which is a generally known non-phthalate plasticizer was shown. In addition, the ester-based plasticizer composition according to the present invention may implement more improved migration resistance in the case of adding a combination of aliphatic alcohol and polyalkylene glycol having structural characteristics different from each other simultaneously (initial addition), as compared with the case of adding aliphatic alcohol first and adding polyalkylene glycol during the reaction.

As shown in Table 2, it was confirmed that when the ester-based plasticizer composition according to the present invention was employed, not only tensile strength and elongation equivalent to or higher than those of dioctyl terephthalate (DOTP, Comparative Example 1) which is a commonly known non-phthalate-based plasticizer were able to be implemented, but also an advantage in tensile strength change rate and elongation change rate was provided. In addition, the change rate was low in the thermal resistant aging test also.

It was confirmed from the results as such that the ester-based plasticizer composition satisfying the relation according to the present invention may not only exert an excellent effect on improvement of migration resistance and heating loss, but also show synergy as the content of DOTP was decreased in the effect as such. In addition, when the reaction conditions (temperature, pressure, time, and the like) are adjusted harshly in order to decrease the content of DOTP, the polymerization of the ester-based plasticizer is induced rather than the content of DOTP in the composition is decreased, whereby the relation according to the present invention was not satisfied and the synergistic effect therefrom was not exerted.

Hereinabove, although the present invention has been described by specific matters, Examples, and Comparative Examples, they have been provided only for assisting in the entire understanding of the present invention. Therefore, the present invention is not limited to the above Examples. Various modifications and changes may be made by those skilled in the art to which the present invention pertains from this description.

Therefore, the spirit of the present invention should not be limited to the above-described exemplary embodiments, and the following claims as well as all modifications equal or equivalent to the claims are intended to fall within the scope and spirit of the invention.

The invention claimed is:

1. An ester-based plasticizer composition of the following Chemical Formula 1 which satisfies the following Relation 1:

[Chemical Formula 1]

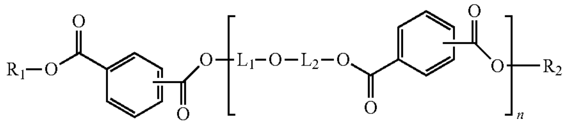

wherein n is an integer of 0 to 10;

$R_1$ and $R_2$ are independently of each other $C_{4-15}$ alkyl; and $L_1$ and $L_2$ are independently of each other ethylene or propylene, $$0.05 \geq |(A_0 - A_{1-3})/A_n| \geq 0.45 \quad \text{[Relation 1]}$$

wherein $A_n$ is the total weight of the ester-based plasticizer composition of 100 wt %;

$A_0$ is the wt % of a compound of Chemical Formula 1 in which n=0; and $A_{1-3}$ is the wt % of a mixture of Chemical Formula 1 in which n=1-3.

2. The ester-based plasticizer composition of claim 1, wherein the composition satisfies the following Relation 2:

$$0 \geq A_{4-10}/A_{1-3} \geq 0.2 \quad \text{[Relation 2]}$$

wherein $A_{1-3}$ is the wt % of the mixture of Chemical Formula 1 in which n=1-3, and $A_{4-10}$ is the wt % of the mixture of Chemical Formula 1 in which n=4-10, and based on a total weight of the ester-based plasticizer composition.

3. The ester-based plasticizer composition of claim 1, wherein $A_0$ is in a range of 30 to 80 wt %, based on the total weight of the ester-based plasticizer composition.

4. The ester-based plasticizer composition of claim 1, wherein $R_1$ and $R_2$ in Chemical Formula 1 are independently of each other $C_{7-13}$ branched chain alkyl.

5. The ester-based plasticizer composition of claim 1, wherein $R_1$ and $R_2$ in Chemical formula 1 are independently of each other $C_{4-6}$ linear chain alkyl.

6. A polyvinyl chloride resin composition comprising the ester-based plasticizer composition of claim 1.

7. The polyvinyl chloride resin composition of claim 6, wherein 5 to 100 parts by weight of the ester-based plasticizer composition is comprised with respect to 100 parts by weight of the polyvinyl chloride resin.

8. The polyvinyl chloride resin composition of claim 6, further comprising: a thermal stabilizer, a filler, or a combination thereof.

9. A molded article manufactured from the polyvinyl chloride resin composition of claim 6.

10. The molded article of claim 9, wherein the molded article is an electric wire covering material, a flooring material, an automobile interior material, a film, a sheet, wallpaper, or tube.

* * * * *